US007425315B2

(12) United States Patent
Kruesi

(10) Patent No.: US 7,425,315 B2
(45) Date of Patent: Sep. 16, 2008

(54) METHOD TO RECAPTURE ENERGY FROM ORGANIC WASTE

(75) Inventor: Paul R. Kruesi, Golden, CO (US)

(73) Assignee: Cato Research Corporation, Golden, CO (US)

( * ) Notice: Subject to any disclaimer, the term of this patent is extended or adjusted under 35 U.S.C. 154(b) by 98 days.

(21) Appl. No.: 10/831,511

(22) Filed: Apr. 23, 2004

(65) Prior Publication Data

US 2004/0253166 A1 Dec. 16, 2004

Related U.S. Application Data

(60) Provisional application No. 60/465,313, filed on Apr. 24, 2003.

(51) Int. Cl.
*C01B 31/02* (2006.01)

(52) U.S. Cl. .................................. 423/445 R; 585/240

(58) Field of Classification Search ................ 588/321, 588/405; 585/240, 241, 242; 201/13–16, 201/20, 25, 27, 36–38; 423/580.1, 173, 445 R
See application file for complete search history.

(56) References Cited

U.S. PATENT DOCUMENTS

| | | | | |
|---|---|---|---|---|
| 3,765,851 A * | 10/1973 | White | ........................ | 48/209 |
| 4,148,710 A * | 4/1979 | Burton, III | .................. | 208/409 |
| 4,148,752 A * | 4/1979 | Burger et al. | ............... | 502/431 |
| 4,246,255 A * | 1/1981 | Grantham | .................. | 588/314 |
| 4,259,414 A | 3/1981 | Williams | .................... | 429/17 |
| 4,435,374 A | 3/1984 | Helm, Jr. | .................... | 423/415 |
| 4,515,659 A * | 5/1985 | Wingfield et al. | ........... | 201/2.5 |
| 4,962,264 A * | 10/1990 | Forester | ...................... | 585/648 |
| 5,821,395 A * | 10/1998 | Price et al. | .................. | 585/241 |
| 5,948,398 A * | 9/1999 | Hanamoto et al. | ......... | 424/76.1 |
| 6,451,094 B1 * | 9/2002 | Chang et al. | ................. | 95/901 |
| 6,929,752 B2 * | 8/2005 | Cansell | ....................... | 210/752 |

OTHER PUBLICATIONS

Kato, Saburo, "Organic Wastes as Biomass Energy Resources and Carbon Dioxide Fixation from Brewery Processing Wastes," 2001, Brewery Association, vol. 96, No. 11, pp. 758-762.*
"Catalytic Activity of Rare-Earth Oxides for the Oxidation of Hydrogen" By: Larry J. Nicks and D.J. MacDonald, Reno Metallurgy Research Center, Reno, NV, Report of Investigation 7841, United States Department of the Interior, Bureau of Mines.
"Destructive Distillation of Scrap Tires" By: D.E. Wolfson, J.A. Beckman, J.G. Walters, and D.J. Bennett, Report of Investigation 7302, United States Department of the Interior, Bureau of Mines.
"Entrainment Drying and Carbonization of Wood Waster" By: Charles C. Boley and W.S. Landers, Report of Investigation 7282, United States Department of the Interior, Bureau of Mines.
Kato, Saburo., "Organic Wastes as BioMass Energy Resources and Carbon Dioxide Fixation From Brewery Processing Water" Brewery Association (2001), vol. 96, No. 11, pp. 758-762 (Translated by Mcelroy Translation Company) English version and a Japanese version.
Perry Chemical Engineering Handbook, Sixth Edition, section 9-4 "Energy Utilization, Conversion, and Resource Conservation".
Perry Chemical Engineering Handbook, Sixth Edition, section 9-7 "Solid Fuels".
Perry Chemical Engineering Handbook, Sixth Edition, section 9-4 "Energy Utilization, Conversion, and Resource Conservation", 1984.
Perry Chemical Engineering Handbook, Sixth Edition, section 9-7 "Solid Fuels", 1984.

* cited by examiner

*Primary Examiner*—Stuart Hendrickson

(57) ABSTRACT

The invention provides methods for extracting energy from organic materials through the production of carbon and water by contacting the organic material with a carbon-oxide gas such as carbon dioxide and/or carbon monoxide at a temperature between about 200° C. and about 600° C. The reactions may be enhanced through the use of microwave irradiation, catalysts and pressure. These methods are helpful in the production of energy while utilizing carbon dioxide and carbon monoxide gases and limiting the landfill of organic materials.

21 Claims, No Drawings

METHOD TO RECAPTURE ENERGY FROM ORGANIC WASTE

CROSS REFERECE TO RELATED APPLICATION

This application claims priority to U.S. Provisional Application Ser. No. 60/465,313, filed Apr. 24, 2003, which is incorporated herein in its entirety by this reference.

FIELD OF THE INVENTION

The invention resides in the field of energy recovery, particularly the conversion of materials containing one or more carbon-hydrogen bonds into carbon and water by reacting carbon dioxide or carbon monoxide with a material containing the carbon-hydrogen bond.

BACKGROUND OF THE INVENTION

Pressure is increasing on international and especially American power producers to curtail or limit the production of gases that contribute to global warming. Of particular interest amongst these gases are carbon monoxide and carbon dioxide, which are produced by the burning of fossil fuels. At the same time, the seemingly unrelated environmental harm of enormous waste production by the most highly developed nations continues to accrue. This waste accumulates when, at the end of their useful life or even during their manufacture, objects made of materials containing carbon-hydrogen bonds become waste. As this waste is generated at diverse locations often far removed from a location optimal for recycle or reuse, these materials end up in landfill waste or decompose in the natural environment.

Examples of such materials include cellulosic materials such as paper, wood, sawdust, bark, cotton and plant waste such as bagasse; thermoplastic materials such as polyethylene, polypropylene, poly vinyl, polyester, styrene and nylon; the thermosetting plastics such as formaldehyde, rigid urethane and foamed urethane; elastomers such as rubber, neoprene and butadiene rubber. All of these materials may be found in the automobile. When autos end their useful life they are commonly shredded and the bulk of metals are recovered and recycled. The remainder of the auto reports to a fraction called "fluff" consisting of unrecovered metals, paper, wood, rubber, plastics, foams, cloths, textiles, circuit boards and large amounts of insulated copper wire. More than four million tons of fluff is generated yearly in the United States alone, with the vast majority being landfilled at great cost and environmental disadvantage. Rubber tires also represent an environmental problem. Similar to fluff, shredded tires contain the residue of steel belts and zinc oxide and sulfur as contaminants.

Attempts have been made to recover value from fluff. These attempts involved various techniques to separate some of the individual plastics which might have sufficient value to justify the expense of separation. In general the non-homogeneity of the feed, and the large weight of undesirables, have discouraged these efforts as it is difficult to extract a clean single material from this mass of soiled material.

In forest management and in the production of wood products, large quantities of "slash" sawdust, and bark are created. In agriculture, chaff such as bagasse is generated. The burning of these materials is energy inefficient and polluting to the atmosphere. Conversion to valuable and readily transported carbon will be very advantageous.

In the preparation of solid fuels such as coal, substantial losses of coal occur in meeting current quality standards requiring the removal of impurities such as sulfur, nitrogen complexes, and heavy metals. Reacting the carbon-hydrogen bond portions of coal produces a carbon product from which impurities are more easily removed.

The problem of waste organics has long been recognized and many attempts to solve it have been made. These solutions have been primarily directed to pyrolysis of the material in an attempt to recover useful hydrocarbon products. Given the complex nature and variability of the waste feeds, this is an almost impossible task.

U.S. Pat. No. 4,166,786 to Duraiswany teaches a process to pyrolyze coal to produce liquid hydrocarbons. The process uses carbon dioxide as a "transfer gas" at temperatures of 1400° F.-1800° F. (760° C.-986° C.). At these temperatures the carbon dioxide will react with carbon to form carbon monoxide, but will not react with carbon-hydrogen bonds to produce carbon. Similarly, U.S. Pat. No. 5,853,687 to Morlec teaches the conversion of waste rubber to carbon black at high temperatures. The resulting pyrolysis hydrocarbons are burned to provide heat for the reaction. Carbon dioxide is used as an "inert" gas for carrying the hydrocarbons.

U.S. Pat. No. 5,470,380 to Cha teaches a two stage process that produces light oils as the product. U.S. Pat. No. 6,548,197 to Chandron uses a combination of high temperature and the water gas reaction to provide added hydrogen for the production of hydrocarbons.

U.S. Pat. No. 3,843,457 to Grannen uses the microwave at low temperatures (200° C.) to process waste organics into a mixture of organic acids, aldehydes, ketones and alcohols. Similarly U.S. Pat. No. 5,084,140 to Holland discloses the use of microwave energy and inert atmospheres to pyrolyze at high temperatures (at least 800° C.), producing a mixture of hydrocarbons.

U.S. Pat. No. 5,084,140 to Chandron teaches a method of converting biomass and other carbonaceous feeds into a hydrogen-rich medium BTU fuel gas for use in a fuel cell. The method uses a fluid bed of various materials including magnesium oxide, alkali carbonates and carbon to effect its results. The process involves providing heat from combustion of part of the product it produces for the steam reforming endothermic reactions which include the water gas reaction to convert carbon to hydrogen and carbon monoxide. The reaction operates at very high temperatures and consumes carbon rather than producing it. Additionally, the reaction requires a novel heat exchange method to overcome the strongly endothermic pyrolytic reaction.

The basic difficulty with these various pyrolysis techniques is that they result in a complex mixture of hydrocarbon products which require a petroleum refinery-like facility to produce marketable end products. Thus, there is a need for a process that can accept a very wide variety of feedstocks and produces a single carbon product, namely carbon, that can be used for energy production. Preferably, this would be an exothermic process such that energy is gained in producing the carbon and limiting the environmental consequences associated with this waste.

SUMMARY OF THE INVENTION

The present invention overcomes the problems with pyrolysis by providing methods of reacting carbon dioxide and/or carbon monoxide, either as gases or in compound form as carbonates or formates, with materials containing one or more carbon-hydrogen bonds to produce carbon and water vapor. The materials containing the carbon-hydrogen bonds may be solids including: polymers such as polyethylene, polyvinyl, styrene; elastomers such as rubber, neoprene and urethane; cellulosics such as; wood, paper, agricultural wastes; and solid fuels such as coal, peat, and petroleum refining residues. By the processes of the present invention, all of these materials are converted to carbon while steam, a second useful and environmentally desirable product, is co-produced. With the use of solid fuels such as low grade coals, the methods of the present invention produce a porous and purified product that is readily separated from undesirable impurities.

In one embodiment of the present invention, carbon and water are produced by reacting an organic material with carbon dioxide, carbon monoxide or a combination of these at a temperature between about 200° C. and about 600° C. Preferably, the organic materials are polymers, elastomers, cellulosics, agricultural wastes and/or solid fuels. The reaction temperature is typically between 300° C. and about 500° C., and more preferably between 350° C. and about 450° C. The organic material can be shredded or cut to a size of less than about 2 inches in the longest dimension to increase the speed and efficiency of the reaction. Preferably, the organic material is rubber, insulated communication wire, polyethylene, polyvinyl chloride, wood, sawdust or coal. The reaction can be carried out in a stainless steel rotary kiln and optionally can be conducted at elevated pressure.

Carbon dioxide for the reaction is preferably supplied as sodium carbonate, potassium carbonate, ammonium carbonate, bicarbonate, magnesium carbonate and/or zinc carbonate. Similarly, the carbon monoxide may be supplied as sodium formate, potassium formate, magnesium formate and/or zinc formate. The carbon dioxide, carbon monoxide or combinations thereof may be supplied as a mixture with water vapor at a temperature greater than about 300° C. Additionally, the reaction may be conducted in the presence of ceric sulphate catalyst. Hydrocarbon gases created in the contacting step may be burned to create heat for maintenance of the reaction temperature. Optionally, the reaction may be performed in the presence of air.

Another embodiment of the present invention provides a reaction between an organic material and carbon dioxide, carbon monoxide or combinations of these compounds at a temperature between about 200° C. and about 600° C. in which vapors created in the reaction are captured and recycled to the reaction.

In another embodiment of the present invention, an organic material is contacted with carbon dioxide, carbon monoxide or combinations thereof at a temperature between about 200° C. and about 600° C. while oils and waxes produced in the reaction are scrubbed with hydroxides, carbonates and/or bicarbonates to form soap-like materials. These soap-like materials may be recycled to the reaction.

DETAILED DESCRIPTION OF THE INVENTION

The present invention provides methods of reacting carbon dioxide and/or carbon monoxide gases with materials containing one or more carbon-hydrogen bonds to produce water vapor and carbon. In its simplest form this may be described as:

$$4C\text{—}H+CO_2 \rightleftharpoons 5C+2H_2O \quad \text{(Equation 1)}$$

or,

$$2C\text{—}H+CO \rightleftharpoons 3C+H_2O \quad \text{(Equation 2)}$$

The materials containing the carbon-hydrogen bond (C—H) may be in the form of gases such as methane ($CH_4$), ethylene ($C_2H_4$) or liquids such as methanol ($CH_3OH$) etc. or solids such as polymers including polyethylene, polyvinyl or cellulosics such as wood, paper, etc. or solid fuels such as coal. For the purposes of this disclosure, the term "organic material" will be used to refer to materials containing carbon-hydrogen bonds. The optimal conditions for these reactions, including temperature, time, reaction surfaces, and pressures varies depending upon the particular feedstock materials utilized.

For the purposes of this disclosure, carbon dioxide will be used as the primary means of illustration although one of skill in the art will readily recognize that carbon monoxide is equally useful in the methods of the present invention although with a different oxygen stoichiometry. Carbon dioxide is primarily used for illustration in this disclosure because it is more easily separated from other gases, is more readily liquefied, and transported and because it contains two of the desired oxygen molecules for reaction rather than just one. There are, however, circumstances where carbon monoxide may be more advantageous than carbon dioxide. For example, at temperatures lower than 500° C., carbon monoxide is thermodynamically preferred in the reaction described above.

The amount of carbon dioxide, whether as gas, carbonic acid, or carbonate, depends upon the material being treated. For materials of low oxygen content such as alkanes, alkenes, or polymers of them, the requirement is to meet at least the stoichiometric amount as shown in Equation 1, or Equation 2. Preferably, the amount is about 125% to about 200% of stoichiometry. For solid fuels such as coal or petroleum coke, which have a high "fixed" carbon the stoichiometry is based upon carbon bonded hydrogen and again, about 125% to about 200% of this quantity is preferred. Cellulosics such as wood, paper and the like contain a large portion of their carbon bonded hydrogen balanced by oxygen in hydroxyl groups. They therefore require much less carbon dioxide. The carbon dioxide is required to begin the reaction of breaking the carbon hydrogen bonds, but is not stoichiometric to the carbon hydrogen present. In this case, about 5% to about 20% of feed weight is preferred.

The optimal temperature range for either gas in these reactions is less than about 727° C. (1000° K). The free energy of the reaction varies with the source of the carbon-hydrogen bonds but is much greater with carbon monoxide than carbon dioxide. This free energy advantage vanishes at temperatures above about 727° C. Similarly the heat evolved in the reaction, the exotherm, is much greater with carbon monoxide than carbon dioxide over the operable range of temperatures. As the temperature of the reaction increases to about 727° C. and greater, undesirable side reactions begin to take place as the system ceases the reactions described above and converts to traditional pyrolysis wherein the carbon dioxide is merely an "inert" carrier gas for the volatile hydrocarbons. Also, at high temperatures the water gas reaction of carbon with water to form carbon monoxide and hydrogen occurs. At temperatures below about 300° C., the kinetics of the reaction are slow. To optimize the reactions described above and to simultaneously lessen or avoid the side reactions associated with pyrolysis and the water gas reaction, the methods of the present invention should be conducted at temperatures between about 200° C. and about 600° C. Temperatures between about 300° C. and about 500° C. are preferred and temperatures between about 350° C. and about 450° C. are preferred for most of the organic reactants.

The optimal time of the reaction is between about thirty minutes and about four hours. Preferably, the reaction is conducted for a time period of about 1 hour to about 2 hours. This time obviously varies with the organic material used in the reaction but also varies with the size of the material used. For example, pieces of rubber, wood, polyvinyl chloride and the like will react more thoroughly and more quickly if shredded or cut into small pieces prior to exposure to the carbon-oxide gasses in the reactions of the present invention. Thus, rubber and polyvinyl chloride are preferably chopped into pieces less than two inches in their longest dimension.

The reactions can be carried out in any suitable reaction vessel that permits the addition and removal of gasses. Additionally, as described below, exposure to microwave irradiation, the use of catalysts and control of the pressure of the reaction may also be desired and should be considered in contemplating the use of different reaction chambers. A stainless steel rotary kiln is an exemplary reaction vessel.

In processing materials containing carbon-hydrogen bonds with carbon dioxide to produce carbon and water vapor, the carbon dioxide reaction and therefore utilization of carbon dioxide is adversely effected when it is supplied to the reaction as a dry gas. When applied as a carbonate such as sodium carbonate, or ammonium carbonate or bicarbonate, there is solid-solid or solid-liquid contact with the carbon-hydrogen bond-containing material that promotes the reaction. It is known that carbon dioxide has a very limited solubility in water at ambient temperatures. It is further known that carbon dioxide and water combine to form carbonic acid in very limited amounts at ambient temperatures. Therefore, it is difficult to get the carbon dioxide to react with the carbon-hydrogen bond material because of difficulty in "wetting" an active surface. If, however, the water and carbon dioxide are combined at a temperature above about 200° C., a reactive carbonic acid is prepared and can improve the reaction described above over that obtained by just reacting with dry carbon dioxide. The formation of carbonic acid is also aided by pressure. From about 10 bar to about 20 bar are sufficient for this formation. Thus, by bringing carbon dioxide and water together in the reaction zone at a temperature above about 300° C., the reaction of the carbon-hydrogen bond material is substantially augmented.

If the vapors exiting the reaction are cooled and recycled back to the reaction zone two very substantial benefits result. First, in the exiting vapors, a part of the water and the unreacted carbon dioxide are united in a fume or fog. The recycle of this gas to the reaction provides a very active form of the carbon dioxide to react with the carbon-hydrogen bond material and a higher utilization of the carbon dioxide is obtained. This does not require the pressurization of the carbon dioxide and water. A second benefit is that if the vapors exiting the reactor are cooled and recycled, they have the desirable effect of being a heat sink to remove heat from the exothermic reaction. Without some means of heat extraction, excessive temperatures may be attained, resulting in undesirable side reactions. Thus, it is important that the reaction temperatures are prevented from rising to the point at which the system ceases reacting and converts to pyrolysis or the water gas reaction as described above.

It is advantageous to bring carbon dioxide to the reaction in the form of carbonates or bicarbonates. Similarly, it is advantageous to bring carbon monoxide to the reaction in the form of formates such as sodium, potassium, magnesium and/or zinc formates. Since small amounts of hydrocarbon oils and waxes can be encountered, it is desirable to scrub them with hydroxides, carbonates or bicarbonates of sodium, potassium, zinc or magnesium and to recycle the resulting soap-like materials to the reaction to increase the formation of carbon. Magnesium carbonate and zinc carbonate are particularly desirable carbonate donors. These carbonates are effective in scrubbing out any transported oils and waxes, and are also particularly effective in the conversion of materials to carbon. Both decompose slightly in excess of 300° C., coincident with the decomposition of many organics, producing a hydrated oxide or hydroxide. Thus, these materials can have a catalytic effect in combining with incoming carbonic acid or carbon dioxide, reacting and releasing additional carbon dioxide to the reaction. These carbonates have the further desirable property that they readily form amines and therefore are easily dissolved in water or aqueous ammonia and removed from the carbon product for reuse in subsequent reactions. The resulting carbon is then upgraded and more suitable for use where such ions might be undesirable.

Ceric sulphate has been found to be a useful catalyst, increasing carbon yield in the reaction under conditions identical to these in which no ceric sulphate is used.

The yields of the reactions of the present invention are necessarily dependent upon the nature of the organic material being processed. Materials high in fixed carbon, such as coal or rubber, result in higher yields of carbon than materials such as polyethylene, which will not pyrolyze to carbon at all. The carbon dioxide reaction results in a substantial production of carbon but is not generally complete. Some oils and waxes are produced and these products are conveniently scrubbed by reaction with alkali earth hydroxides and carbonates or zinc carbonates or hydroxides for recycle to the reaction. Any hydrocarbon gases generated may be used, after condensation of the steam, as fuels for maintaining reaction temperatures.

When processing materials that have no fixed carbon, it is advantageous to have small amounts of oxygen in air present in the reaction. The presence of this oxygen in air promotes the reaction. Without intending to be bound by any one theory, it is believed that this results through the formation of carbon monoxide which has a higher free energy of reaction than carbon dioxide at moderate (200° C.-600° C.) temperatures.

Microwave energy can optionally be used to initiate or enhance the reaction. Carbon is a strong microwave receptor and therefore, as the reactants begin to form carbon, the microwave concentrates energy on the newly formed carbon, propagating the energy through the material even though many organic materials are normally considered to be heat insulators. Most microwave sources will be adequate to supply or enhance the energy of the reactions of the present invention. One exemplary source is a 2450 megahertz microwave. Typically, the microwave is used to enhance the reaction but is not used for the full duration of the reaction. The amount of energy supplied will depend upon the amount of carbon in the organic material and the amount of the organic material used in the reaction. For example, using less than about 200 grams of coal, the amount of energy supplied would be between about 0.1 kilowatt hours and about 0.5 kilowatt hours.

The kinetics of the reactions of the present invention are very dependent upon the specific material containing the carbon-hydrogen bond. Suitable candidates for the reactions have been demonstrated and will be described here as examples of the materials that are of particular interest for the production of carbon and water.

1) Polymers: Plastics such as polyethylene, polypropylene, polyvinyl, and elastomers such as rubber (polyisoprene) and polyurethanes. These materials are solids at room temperature and melt or become viscous liquids upon heating. At higher temperatures these materials pyrolyze and become gases, and offsetting oils, waxes and carbon. These reactants may contain various plasticizers, fillers, ultraviolet light absorbers, polymerizing agents and the like. At 200° C. they are largely inert. Above 200° C., the reactions with carbon dioxide and or carbon monoxide of the present invention begin to occur. At 300° C., the reactions with polyvinyl or polyethylene become significant. As the reactions are exothermic, they spread rapidly through the organic mass. As noted above, it is advantageous to expose the reaction to small amounts of oxygen as air when processing materials such as polyethylene. Alternatively, carbon monoxide may be used or included in the reaction as the primary carbon oxide when these materials are used.

While some melting of rubber has been noted, it tends primarily to react as a solid, producing a very porous and friable product often having some shape characteristics of the original rubber reactant. The range of temperature for these materials falls within the optimal range of between about 300° C. and about 600° C. The preferred range is about 400° C. to about 550° C. and the range of the most preferred reaction temperature is about 450° C. to about 500° C.

2) Cellulosics: Wood, cotton, paper, plant fibers, slash and the like. These materials are based on beta-glucosides which contain balanced contents of hydrogen ions and hydroxyl ions. The hydrogen ions and hydroxyl ions are both bound to carbon and in pyrolysis, a variety of gaseous and liquid hydrocarbons are produced in addition to carbon. In contrast, during the reactions of the present invention with carbon dioxide (carbonate) or carbon monoxide (formate) the cellulosics are substantially converted to carbon and water. The products may retain their fibrous wood or thread form but are changed to a friable carbon. Because of the presence of hydroxyl ions in an almost stoichiometric balance with the hydrogen ions present in these cellulosic materials, a less than stoichiometric amount of carbon dioxide is required to effect the breaking of the carbon-hydrogen bonds. The quantity of carbon dioxide needed depends upon the particular cellulosic being treated. It is at least about 5% of the weight of the reactant material but less than about 25%. With massive pieces, such as processed chipped wood or shredded rubber, it may be advantageous to recycle the carbon product. The preferred reaction temperature for cellulosic materials is between about 300° C. and about 500° C.

3) Fuels: Coal, lignite, peat, petroleum residues and the like. While these materials have greater or lesser amounts of "fixed" carbon they also contain a substantial amount of carbon-hydrogen bonds which form a complex of hydrocarbons upon pyrolysis, many of which are noxious. The reaction with carbon dioxide can be termed "anti-pyrolysis" as it has the effect of breaking the hydrocarbon bonds and producing an upgraded or refined carbon product. During the reaction, coal becomes porous and friable. This change in physical condition permits reactions to remove unwanted substances such as sulfur, nitrogen compounds and heavy metals. This friable form also makes it possible to separate the coal from intermixed minerals and rock. The preferred reaction temperature for materials high in fixed carbon, such as coal, is about 400° C. to about 600° C. More preferably, the reaction temperature for these materials is about 500° C. to about 550° C. The reaction of these fuels, and particularly coal, is enhanced by treatment with microwave energy. Short exposures of under about 15 minutes cause graphitization and improve the electrical conductivity of the reactants.

4) Varnished Copper Wire, Enameled and Lithographed Aluminum Beverage Cans. Copper wire in transformers, solenoids, motors, and the like is often insulated with varnish. This may be removed by pyrolysis, but this requires high temperatures and produces fumes and soot which must be managed by after burners and scrubbers. Through the use of the methods of the present invention, lower temperatures are required and a loose carbon product results along with steam and the cleaned copper. The preferred temperature for this reaction to remove the insulation on copper wire is at least about 500° C. and preferably between about 500° C. and about 600° C.

Similarly, when aluminum beverage cans are recycled, they have organic coatings and labels which require removal before melting. The elaborate means used to effect this removal requires temperatures hot enough for the aluminum to partially oxidize and react with the pyrolyzed carbon. In contrast, aluminum beverage cans are effectively cleaned of their coatings and labels in the methods of the present invention at about 500° C. resulting in the production of the cleaned aluminum, a readily-separated carbon product and steam.

5) Special Recycling Materials: Polyvinyl chloride, Bromine Containing Circuit Boards.

Polyvinyl chloride presents a special recycling problem because its decomposition generates hydrochloric acid. Circuit boards, which often have a high bromine content to improve heat conductivity, similarly represent a special recycle or disposal problem. In the processes of the present invention, reaction with carbon dioxide converts these halogenated organics found in polyvinyl chloride and bromine containing circuit boards to carbon and water allowing recovery of hydrogen chloride or hydrogen bromine from the exit gas stream. Alternatively, carbonate or hydroxide in an amount stoichiometric to the chloride or bromide can be used to trap the chloride or bromine immediately in the reactor. The resulting carbon is then washed to effect recovery of the chlorine or bromine and a purified carbon product.

Additional objects, advantages, and novel features of this invention will become apparent to those skilled in the art upon examination of the following examples thereof, which are not intended to be limiting.

EXAMPLES

Example 1

This example demonstrates the high conversion of waste rubber to carbon and water. 200 grams of mixed rubbers separated from automobile shredder residue were reacted in an externally-heated stainless steal rotary reactor with atmosphere control. The rubber was chopped into pieces smaller than two inch and blended with 60 grams of sodium bicarbonate. The mass was batch reacted with a water-wetted carbon dioxide preheated to furnace temperature. The reaction began at 202° C. and was brought to 500° C. over a time period of 130 minutes. 130 liters of carbon dioxide were supplied to the reaction. The products were 118 grams of carbon product which assayed 70% carbon and 1.2% hydrogen, 24% ash, and 13 grams oil. The estimated carbon yield compared to feed was 62% (a small weight of steel wire from tire belting was not included in the product weight).

Example 2

The example shows that ceric compounds are an effective catalytic addition. 200 grams of mixed rubber from auto shredder residue was blended with three grams of ceric sulphate as catalyst and reacted with wetted carbon dioxide as described in Example 1 at similar temperatures. 150 liters of wetted carbon dioxide were added to the reaction. The product was 114 grams of carbon and 6 grams of oil. The carbon product was 66.6% carbon, 1.2% hydrogen and 28% ash.

Example 3

This reaction illustrates that even very difficult plastics can be converted to carbon and water and that oils and waxes can be recovered and returned to the reaction. 100 grams of polyethylene derived from chopping-insulated communication wire, were blended with 203 grams of sodium carbonate and wax recycled from a previous test, to establish an equilibrium recycle of wax and oil. 200 liters of wetted and preheated carbon dioxide were supplied to the reaction as 200 liters of air. The reaction began at 296° C. and was bought to 476° C. over a 100 minute time period. The product weight was 143 grams which, after washing to remove sodium carbonate, resulted in a 32 gram product which assayed 65% carbon and 8.4% hydrogen. Estimated carbon yield was 26%.

Example 4

This example demonstrates the effectiveness of zinc carbonate in promoting the reactions of the present invention and the equilibrium obtainable in recycling the wax that is scrubbed from the product. 100 grams of the polyethylene of Example 3 were blended with 92 grams of zinc carbonate and 83 grams of a wax-sodium carbonate mixture scrubbed from a previous reaction. The blend was reacted in a rotary kiln with 240 liters of wetted, preheated, carbon dioxide and 180 liters of air added over 120 minutes as the temperature was brought from 220° C. to 512° C. The product was 126 grams of wax and 86 grams of sodium carbonate in the scrubber. After an ammonia wash to remove zinc hydroxide, and an acid wash to remove sodium carbonate, 29 grams of carbon product were produced.

Example 5

This example demonstrates the effective processing of polyvinyl chloride. 200 grams of polyvinyl chloride were cut from schedule 40 PVC pipe. Pieces less than two inches in length were blended with 186 grams of recycled sodium carbonate and wax from previous experiments. 127 liters of wetted, preheated, carbon dioxide was added over a two hour period. During the first hour, the reaction temperature was held below 320° C. and 120 liters of air were added. The temperature was raised to 450° C. The product weighed 121 grams, which was reduced to 60 grams after washing. The washed product assayed 73% carbon and 4% hydrogen. The scrubber gave 198 grams of wax-sodium carbonate. The estimated carbon yield was 58%.

Example 6

This example illustrates that the methods of the present invention are effective for cellulosics such as wood. 200 grams of a coarse sawdust was blended with 208 grams of wax and sodium carbonate from a previous run. 108 liters of wetted, preheated carbon dioxide and 108 liters of air were added over 108 minutes. The reaction temperature was increased from 120° C. to 483° C. The carbon product weighed 117 grams with the scrubber wax and sodium carbonate weighing 204 grams. After washing and drying, the product was 76 grams and assayed 77% carbon and 9% hydrogen. Carbon yield was estimated to be 74%.

Example 7

This example demonstrates upgrading the quality of coal in the methods of the present invention and the enhancement of the process with microwave energy. 200 grams of a commercial coal (Elkhorn No. 2 Seam) were ground to minus 20 mesh and processed in the rotary reactor. Input was 248 liters of wetted and preheated carbon dioxide and 248 liters of air. Over a two hour period, the temperature was raised from 241° C. to 501° C. The product weighed 166 grams. The carbon assay of the coal feedstock was 72.7% and was raised to 73.3% by the process. The hydrogen-to-carbon ratio of 0.073 in the feedstock decreased to 0.045. The carbon yield was 84%. The product was further irradiated with a 2450 megahertz microwave for 15 minutes during which 0.24 kilowatt hours of energy was applied. The carbon assay of the product was raised to 77.4% and the hydrogen-to-carbon ratio decreased further to 0.015. The carbon yield after the microwave irradiation was 90%.

Example 8

This example illustrates that the processes of the present invention are effective in "de-enameling" aluminum and copper. 63 grams of cuttings from aluminum beverage cans were charged to a rotary reactor and reacted with 60 liters of wetted, preheated, carbon dioxide. The furnace was brought from 270° C. to 490° C. The product was 60 grams of clean aluminum and three grams of a friable carbon product.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of oxidizing an organic material comprising contacting an organic material with at least one of carbon dioxide, carbon monoxide and combinations thereof, in the presence of steam at a temperature between about 300° C. and about 500° C., and for a time between about 30 minutes and about 4 hours, wherein the organic material is oxidized to produce carbon and steam.

2. The method of claim 1, wherein the organic material is selected from the group consisting of polymers, elastomers, cellulosics, agricultural wastes and solid fuels.

3. The method of claim 1, wherein the temperature is between 350° C. and about 450° C.

4. The method of claim 1, wherein the organic material is shredded or cut to a size of less than about 2 inches in the longest dimension.

5. The method of claim 1, wherein the organic material is selected from the group consisting of rubber, insulated communication wire, polyethylene, polyvinyl chloride, wood and sawdust.

6. The method of claim 1, wherein the contacting is conducted in a stainless steel rotary kiln.

7. The method of claim 1, wherein the contacting is conducted at a pressure greater than atmospheric pressure.

8. The method of claim 1, wherein the carbon dioxide is supplied as a compound selected from the group consisting of sodium carbonate, potassium carbonate, ammonium carbonate, bicarbonate, magnesium carbonate, zinc carbonate and combinations thereof.

9. The method of claim 1, wherein the carbon monoxide is supplied as a compound selected from the group consisting of sodium formate, potassium formate, magnesium formate and zinc formate.

10. The method of claim 1, wherein the contacting step is performed in the presence of ceric sulphate.

11. The method of claim 1, comprising the additional step of burning hydrocarbon gases created in the contacting step to create heat for maintenance of the temperature of the contacting step.

12. The method of claim 1, wherein the contacting step is performed in the presence of air.

13. A method of oxidizing organic materials comprising:
   a. contacting an organic material with a compound selected from the group consisting of carbon dioxide, carbon monoxide and combinations thereof, in the presence of steam at a temperature between about 300° C. and about 500° C., and for a time between about 30 minutes and about 4 hours,
   b. capturing vapors created in the contacting step, and
   c. recycling the captured vapors to the contacting step.

14. The method of claim 13, wherein the compound is supplied as a compound selected from the group consisting of sodium hydroxide, potassium hydroxide, sodium carbonate, sodium bicarbonate, sodium formate, potassium formate, magnesium formate, zinc formate and combinations thereof.

15. The method of claim 13, wherein the organic material is selected from the group consisting of rubber, insulated communication wire, polyethylene, polyvinyl chloride, wood and sawdust.

16. A method of oxidizing organic materials comprising:
   a. contacting an organic material with at least one of carbon dioxide, carbon monoxide and combinations thereof in the presence of steam at a temperature between about 300° C. and about 500° C.,
   b. scrubbing any oils and waxes produced in the contacting step with a compound selected from the group consisting of hydroxides, carbonates and bicarbonates to form a soap-like material, and
   c. recycling the soap-like material to the contacting step.

17. The method of claim 16, wherein the organic material is selected from the group consisting of rubber, insulated communication wire, polyethylene, polyvinyl chloride, wood, sawdust and coal.

18. The method of claim 16, wherein the compound is magnesium carbonate or zinc carbonate.

19. The method of claim 16, wherein the compound is selected from the group consisting of sodium hydroxide, potassium hydroxide, sodium carbonate, sodium bicarbonate, sodium formate, potassium formate, magnesium formate, zinc formate and combinations thereof.

20. A method of oxidizing a solid fuel comprising contacting the solid fuel with at least one of carbon dioxide, carbon monoxide and combinations thereof, in the presence of steam at a temperature between about 300° C. and about 500° C., wherein the solid fuel is oxidized to produce a friable, refined carbon product and steam.

21. The method of claim 20, wherein the solid fuel is selected from the group consisting of a coal, lignite, peat, and petroleum residue.

* * * * *